Nov. 14, 1967   P. H. CLEFF ETAL   3,352,177
EPICYCLIC GEARS
Filed March 12, 1965   6 Sheets-Sheet 1

Inventors
P. H. Cleff
C. Beavers
W. Walton
By Gustav H. Emery Atty.

Inventors
P. H. Cleff
C. Beavers
W. Walton
By G. H. Emery Atty.

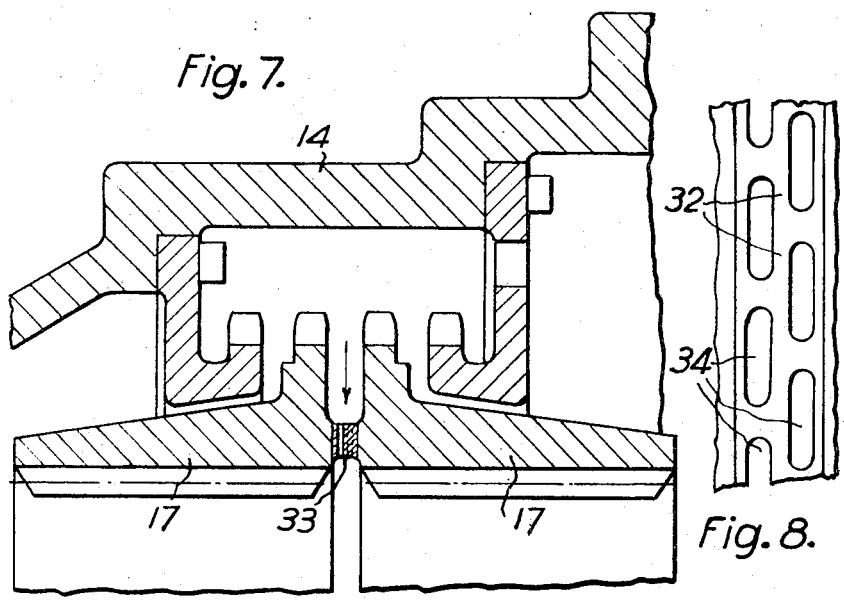
Fig. 7.
Fig. 8.
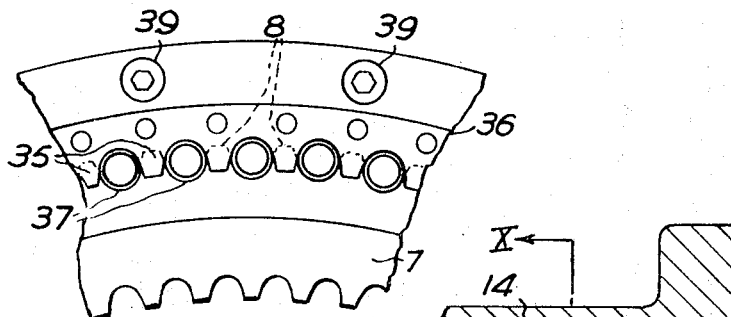
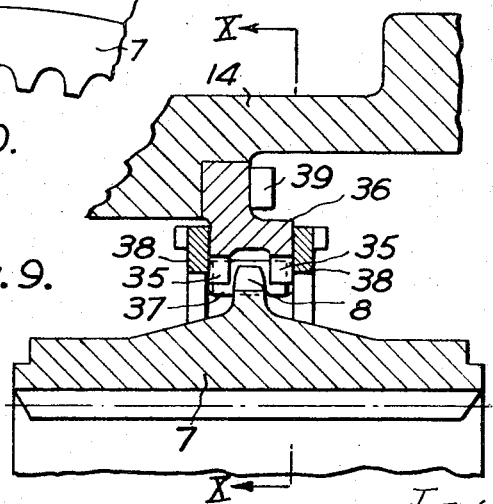
Fig. 10.
Fig. 9.
Inventors
P. H. Cleff
C. Beavers
W. Walton
By G. H. Emery Nov. 14, 1967  P. H. CLEFF ETAL  3,352,177
EPICYCLIC GEARS
Filed March 12, 1965  6 Sheets-Sheet 5

Inventors
P. H. Cleff
C. Beavers
W. Walton
By G. H. Emery

Nov. 14, 1967   P. H. CLEFF ETAL   3,352,177
EPICYCLIC GEARS
Filed March 12, 1965   6 Sheets-Sheet 6
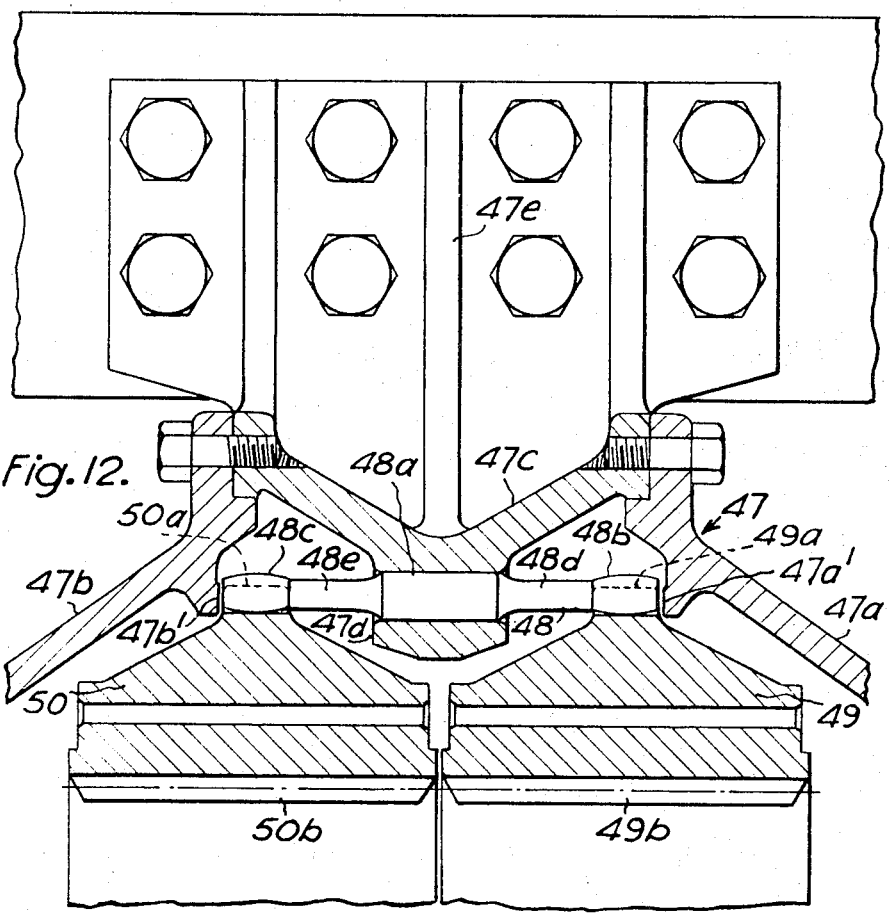
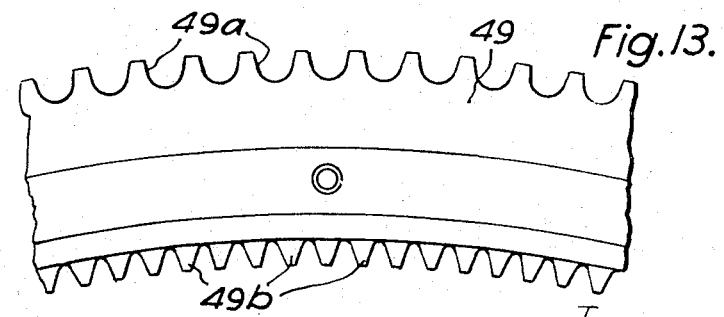
Inventors
P. H. Cleff
C. Beavers
W. Walton
By G. H. Emery Atty.

United States Patent Office 3,352,177
Patented Nov. 14, 1967

3,352,177
EPICYCLIC GEARS
Peter Herbert Cleff, Cyril Beavers, and William Walton, all of Wallsend Research Station, Wallsend-on-Tyne, England
Filed Mar. 12, 1965, Ser. No. 439,263
Claims priority, application Great Britain, Mar. 17, 1964, 11,299/64; Sept. 1, 1964, 35,778/64
8 Claims. (Cl. 74—801)

The present invention relates to epicyclic gears having a plurality of planet wheels disposed in mesh with a sun pinion and an internally toothed annulus, either the sun pinion or the annulus or the planet carrier being stationary during operation. Although the applications shown relate specifically to those in which the annulus is kept stationary, the principles of the invention are also applicable to epicyclic configurations with rotating annulus.

Gears of the multi-planet epicyclic type can only transmit maximum possible load if it can be ensured that the torque load is shared equally between the various sun/planet meshes on the one hand and the corresponding planet/annulus meshes on the other. However, initial inaccuracies in the various component parts, some of the distortion due to load and unequal wear, tend to lead to unequal distribution.

Basically, load equalisation requires that either sun pinion, annulus or planet carrier be given two degrees of translatory freedom in a plane at right angles to the main axis of the gear unit without rotational freedom about its own axis. If double helical gears are used, this transverse freedom must be allowed to each of the helices of one of the geared members while simultaneously providing adequate axial constraints. However, the method of load-equalisation just outlined is insufficient if more than one planet is interposed between sun pinion and annulus. In any such multi-planet configurations at least one member must be made and/or supported in such a way that it can assist such load equalisation by elastic deformations which must, however, be kept within the fatigue limit of the material specified for this member.

Various solutions of the practical problems thus presented have been proposed. Such solutions have included a double-toothed coupling; that is to say, a coupling which has one set of teeth meshing with coupling teeth on the outside of the annulus or inside the sun pinion and another set meshing with teeth directly or indirectly carried in the gear casing or in the drive shaft to the sun pinion. To allow for transverse movement of the controlled member, where the two sets of teeth are at substantially the same diameter, they have been well spaced axially to permit the titlting involved, and to the same end the coupling teeth have been barrelled and made very short. Another proposal was to make the coupling in the form of a member extending radially between the annulus and an internally toothed member in the casing.

Another solution proposed consists in coupling the annulus to the casing by the aid of pins lodged in holes and a resilient sleeve, the latter being either between the ends of the pins and the casing or between the mid-part of the pins and the annulus. Another proposal depending on resilience in the coupling means comprises helical springs lodged in axial grooves in the casing and annulus to keep them together while allowing relative transverse float.

Of these prior proposals, those employing toothed couplings are the most certain in action but they are expensive to manufacture, bulky and tend to make assembly and disassembly difficult, especially in confined spaces such as ships' machinery compartments, in connection with which gears of the kind in question are especially suitable as a second reduction stage between turbine engines and propeller shafts.

The present invention is concerned with the case in which the transverse freedom is allowed between the annulus and gear casing, and according to the invention the coupling between the annulus and casing is provided by means including a plurality of axial pins distributed around the periphery and engaging in the spaces between the teeth of at least one sprocket secured to one of the two members to be coupled. By sprocket is meant a toothed wheel, the teeth spaces in which are shaped to co-operate with circular section male teeth. The pins may also engage between the teeth of two other sprockets on either side of the above-mentioned sprocket secured to the other of two members to be coupled, or they may be held in the other of the two members, in which case they form cantilevers, the free ends of which engage between the sprocket teeth and they are then so dimensioned that they are slightly flexible under the working load and their other ends engaging between the sprocket teeth are barrelled to allow for the flexing.

In the case of flexible pins, they are desirably double-ended, the centre portions being of large diameter and lodged in bores in the one member. Then their outer ends engage in respective sprockets and these may be associated with respective helices in the case of double helical wheels.

In any of the arrangements according to the invention, provided adequate clearance is left between the pins and sprockets, the necessary transverse freedom will be afforded to ensure substantial equalisation of the load between the several planets, while maintaining the necessary circumferential restraint.

Where sprockets are used on the members to be coupled, the pins may be linked together to form a roller chain. This can be arranged to facilitate assembly and disassembly.

The invention will be further described with reference to the accompanying drawings in which:

FIGURES 4 to 7 are similar views to FIGURE 3 a second, third, fourth and fifth embodiment respectively.

FIGURE 8 is a detail of FIGURE 7 looking in the direction of the arrow.

FIGURE 9 is a similar view to FIGURE 3 of a sixth embodiment.

FIGURE 10 is a detail of FIGURE 9 taken on the line X—X.

FIGURE 12 is a similar view to FIGURE 3 of an eighth embodiment, and

FIGURE 13 is a detail taken at right angles to FIGURE 12.

Like parts bear the same references in the various views.

Figure 1:
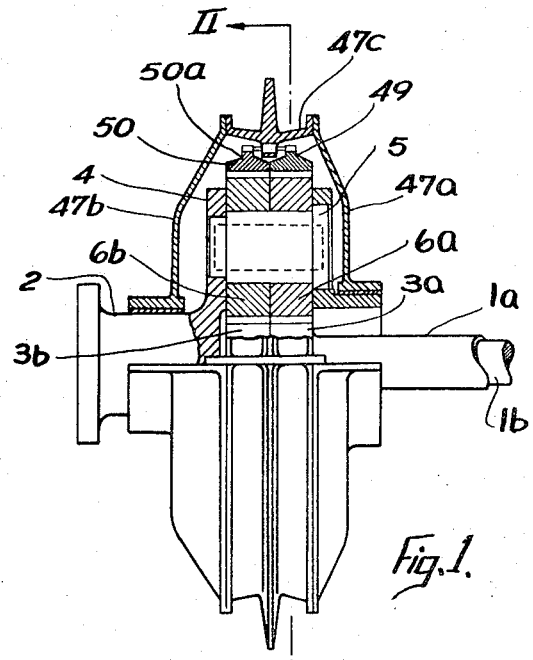
FIGURES 1 and 2 are a longitudinal section and a cross-section respectively of a first embodiment of the invention.
Figure 2:
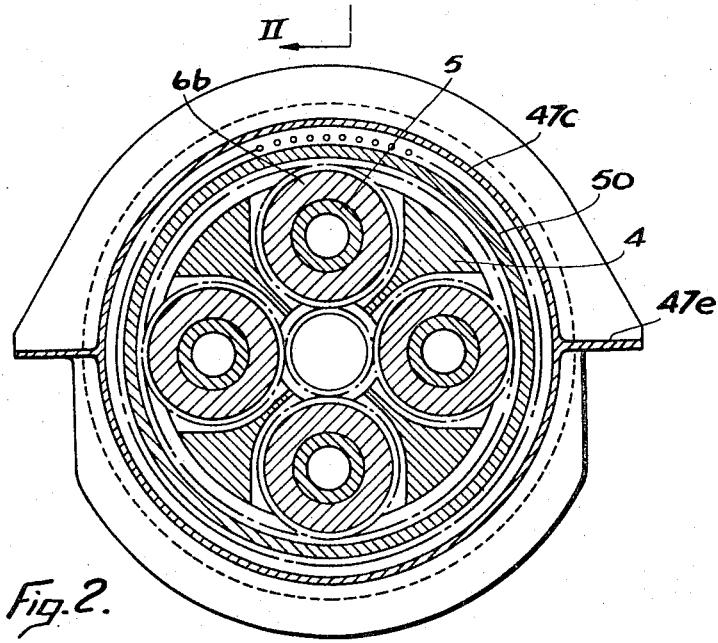
Figure 3:
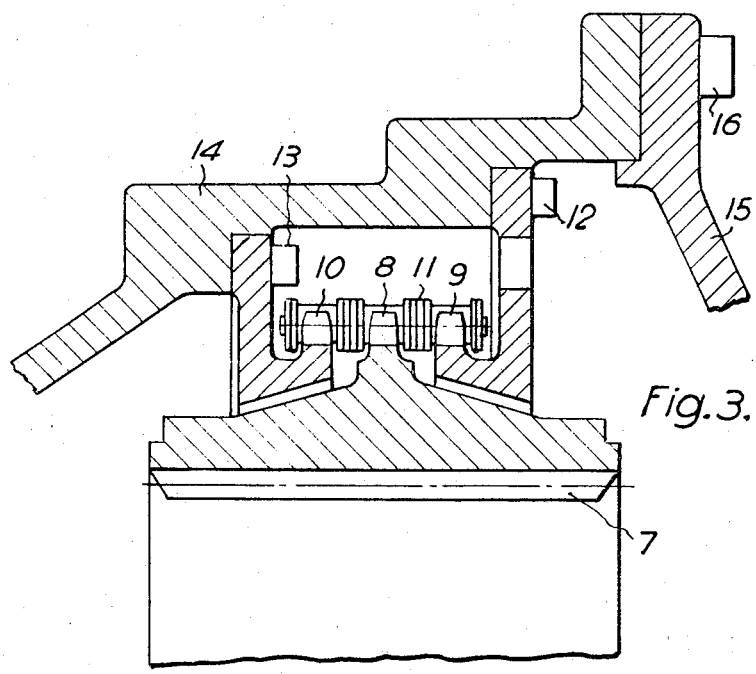
FIGURE 3 is a detail of FIGURE 1 on a larger scale.

In FIGURES 1 and 2, 1 represents the input shaft and 2 the output shaft of a "second reduction" gear such as might be used in the drive to a ship's propeller shaft. The input shaft 1 carries a planet carrier 4. Hollow planet spindles 5 are accommodated in the planet carrier 4 and carry planets 6. The planets 6 mesh with a single internally toothed annulus 7 which carries, centrally in this example, a sprocket ring 8. For clarity's sake, individual teeth are not shown either in respect of gears or sprockets, but the position of the pitch line of the sprocket is indicated in FIGURE 2 at B. The sprocket ring 8 is flanked by stationary sprockets 9 and 10. The sprockets 9 and 10 are linked with sprocket 8 by a roller chain 11 which is shown in FIGURE 3. The sprockets 9 and 10 are fastened by (high tensile) bolts 12 and 13 (see FIGURE 3) to the stationary gear casing 14. The position of the pitch line for bolts 13 is shown in FIGURE 2 at C. The chain rollers thus form axial pins distributed around the periphery and serving to couple the annulus 7 to the casing 14 sufficient clearance being allowed to give the annulus the necessary 2 degrees of translatory freedom transverse to the main access to the gear. On removing the end cover 15 access is obtained to the bolts 12 and 13 (the latter through openings in the sprocket 9), and after these have been removed it is possible to withdraw axially, to the right, sprockets 9, 8 and 10 together with chain 11 as a unit.

It is a simple matter to provide for the removal or insertion of chain 11 without withdrawing any of the sprockets. For this an access hole (not illustrated) is provided in casing 14 in way of chain 11. Then after removing the fastening bolts 12 and 13 and the chain closing pin the chain 11 can be run out by rotating the sprocket assembly by means of e.g. a worm and worm wheel drive (not illustrated) and conversely, by such rotation a new chain can be picked up, and wound around the sprockets.

In FIGURE 3 parts are numbered as in FIGURES 1 and 2. The chain 11 is shown as a conventional triplex roller chain. 16 represents bolts by which the end cover 15 is fastened to the gear casing 14.

It will be seen that after removing the end cover 15 both the bolts 12 and 13 become accessible and can be removed whereby the sprocket, chain and annulus assembly is freed for removal or rotation.

Figure 4:
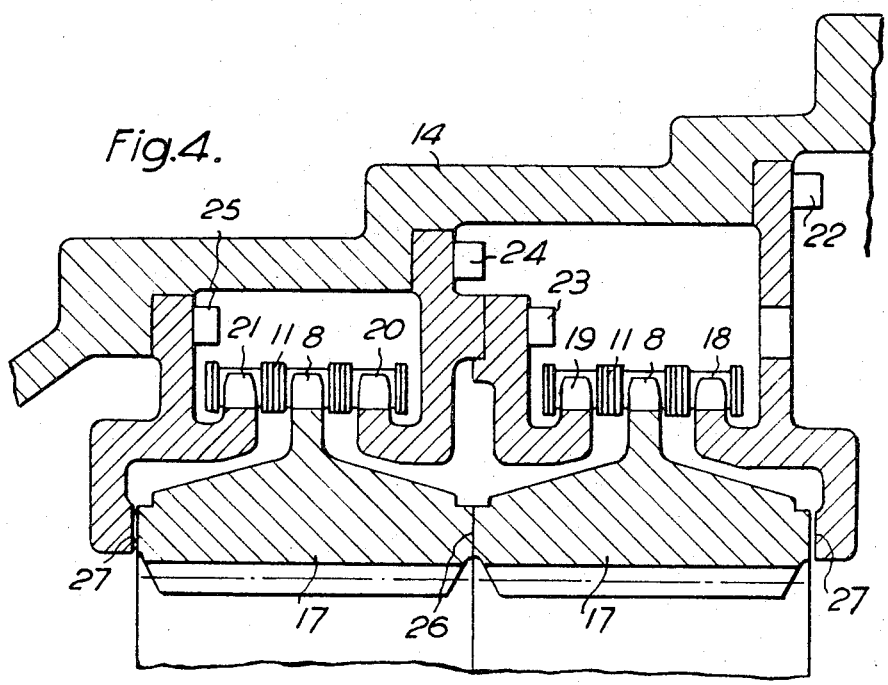

If it is desired to use double helical gearing several solutions of the problem then arising of taking up axial thrusts on the gear components can be provided in the following manner:

FIG. 4 shows an arrangement using two annuli 17 each of which is equipped with a sprocket 8 and supported by a triplex roller chain 11 which engage stationary sprockets 18, 19 and 20, 21 respectively. These stationary sprockets can be freed from the casing 14 by removing first bolts 22 and 23, the latter being accessible through openings in the carrier of the sprocket 18. In theory, the first sprocket chain and annulus assembly can be removed by a screw motion but in practice it may be more convenient to remove first the associated planet gears. For this purpose, one first removes one helical gear of each planet (not illustrated) which are by way of example made in two parts, one for each helical gear, coupled to each other by means of Hirth couplings and locked together by means of an internal ferrule, the first sprocket chain and annulus assembly can then be withdrawn axially by a straight line motion. Thereby the holding bolts 24 and 25 become accessible, the bolts 25 through openings not shown in the carrier of sprocket 20, and after these have been removed it is possible to withdraw the second sprocket, chain and annulus assembly by a screw motion. Alternatively, the remaining helical gears of the planets can be withdrawn with screw motion whereupon the second sprocket, chain and annulus assembly can be withdrawn by a straight line motion.

The helices of the annuli are preferably handed in such a sense that whilst driving ahead (when torque is usually designed to be greater than whilst driving astern) the annuli are urged against each other. The end faces of the annuli are prepared for making sliding contact with each other at 26 or alternatively with thrust bearing surfaces 27 on extensions of the carriers of the outermost sprockets 18 and 21 during astern running. The preparation may consist in forming a good plane surface by turning, grinding and lapping and by the provision of pockets for the retention of lubricant. Alternatively, washers (not illustrated) of sintered bronze impregnated with e.g. graphite, oil or "PTFE" (polytetrafluoroethylene) may be interposed between the end faces of annuli and co-operating thrust faces.

Figure 5:
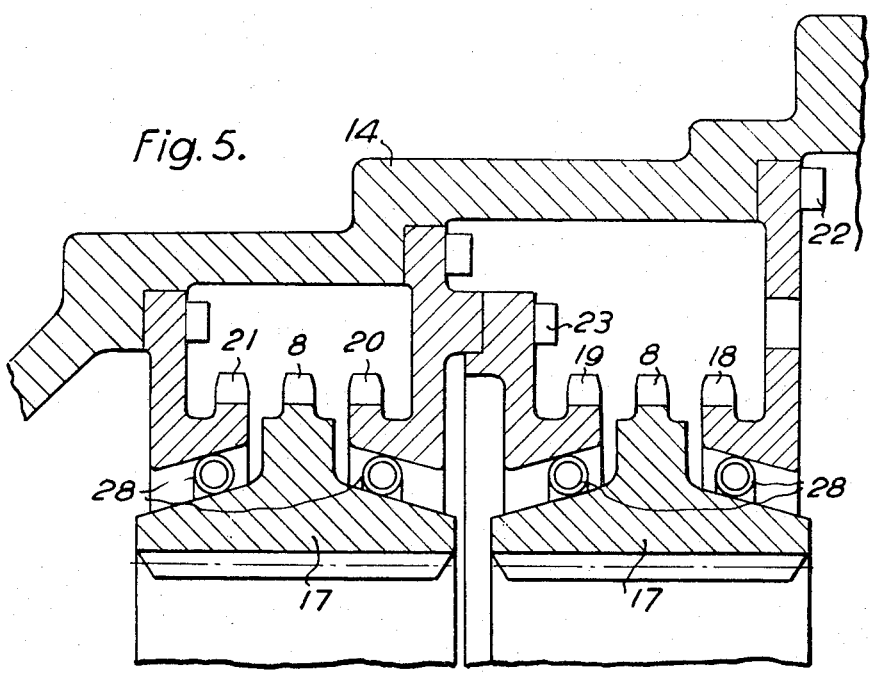

FIG. 5 illustrates a variant of the previous arrangement, differentiated by the use of flexible rollers 28 interposed between annuli 17 and the co-ordinated holders for the stationary sprockets 18, 19 and 20, 21 respectively. The innermost surfaces of the sprocket carriers and the cooperating outer shoulders of the annuli are substantially conical and substantially parallel to each other. The flexible rollers 28 are shaped as garter (helical) springs. When the annuli are urged axially towards or away from each other by the axial components of the gear tooth contact forces, the innermost or outermost pairs respectively of flexible rollers will be pinched, and resist the axial motions of the co-ordinated annuli.

Alternatively, in order to define better a position of repose of the flexible rollers 28 the conical tracks on which they roll may be shaped not strictly conically, i.e. with straightline section, but one at least is formed with a slightly concave section towards the flexible roller so as to lead to pinching of the section of the flexible rollers should they wander out of the desired position.

Figure 6:
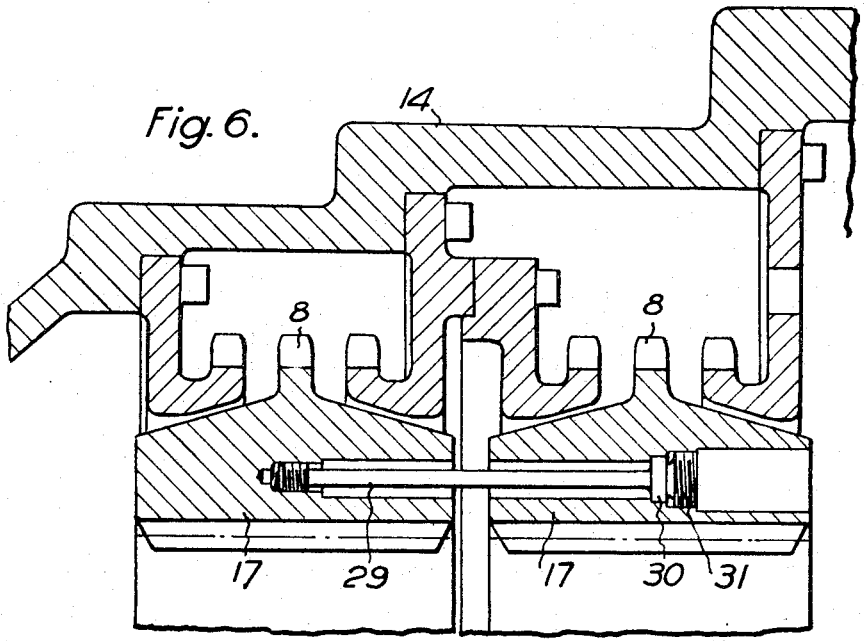

FIG. 6 shows a further variant of the arrangement shown in FIGURE 4 differentiated by the use of flexible ties 29 interconnecting the annuli 17. For this arrangement, the helices are handed preferably so that the ties are in tension when driving ahead, i.e. whilst torque is at its greatest. By way of example, the tie is shown screwed into one of the annuli and restraining the other one from moving apart by means of a shoulder under the head 30. The head 30 is restrained from moving away from its seat during torque reversal, by means of a retaining plug 31.

FIGS. 7 and 8 show a further variant in which the two annuli 17 are connected to each other by an axially resilient integral system of plate springs 32 which are formed by piercing a cylindrical hollow neck 33 between the annuli by circumferential slots 34 arranged in at least two rows (as shown) and which are staggered with respect to each other. In such an arrangement a roller chain with four rollers in parallel would be used.

FIGS. 9 and 10 illustrate an arrangement in which separate rollers are used. Only one such arrangement is shown, in conjunction with a single annulus, but the various arrangements with two annuli can be adapted without difficulty to the use of separate roller suspensions.

The annulus 7 is equipped with a sprocket ring 8 which is flanked by two rows of sprocket teeth 35 on a common sprocket carrier 36. The outer sprocket teeth point inwards and the sprocket 8 is entered into the space between the rows of teeth 35 by aligning first the one system of teeth with the intertooth spaces of the other system and then rotating one system with respect to the other half a tooth pitch or an odd multiple thereof. Rollers 37 are then inserted into sprocket tooth interstices and retained by cheek plates 38.

The sprockets rollers and annulus assembly can be removed as a whole from the gear case after removing fastening bolts 39 in a manner analogous to those described above.

Figure 11:
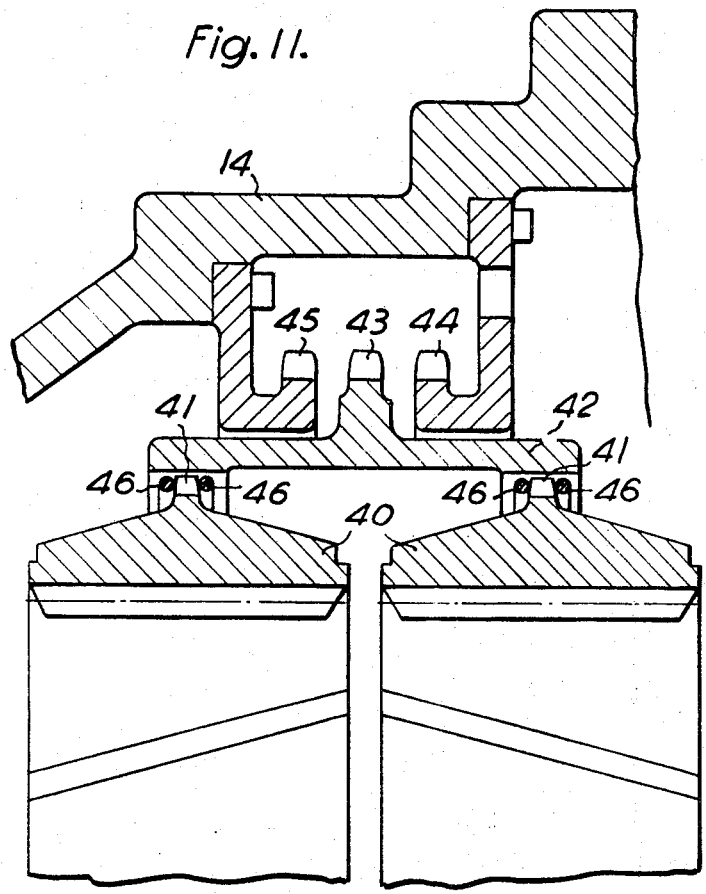
FIGURE 11 is a similar view to FIGURE 3 of a seventh embodiment.

FIG. 11 shows a further variant. Two annulus 40 are equipped on their outside with helical gear teeth 41 which form a fine tooth coupling by which they are connected to the floating carrier ring 42 which on its outside is equipped with a sprocket ring 43 which is intended to be coupled by a triplex roller chain (not shown) to stationary sprockets 44 and 45 respectively. Circlips 46 locate the fine tooth coupling for ease of assembly and disassembly but are not intended to carry axial thrust. The axial components of the gear tooth contact pressure are balanced by the axial components of the fine tooth coupling contact pressures. In order to achieve this, the helix angle of the fine tooth coupling is chosen suitably larger than the helix angle of the associated helical gears (i.e. so that the tangents of the angles are in the same ratio as the radial distances from the axis of the epicyclic gear).

In most of the examples given, the sprocket ring 8 has been shown as central with respect to the co-ordinated annulus. This is not necessarily the best disposition.

In view of the fall-off of torque towards the free ends of sun wheel and planets, it is not certain that the load (tooth pressure) is, or remains after wear, uniform along the tooth pitch lines. In order to keep warping forces on the annuli to a minimum in these conditions, an axial displacement of the sprocket or fine tooth coupling may be necessary such that the integrals of moments (tooth pressure over elementary areas of contact multiplied by distance from centre of sprocket or fine tooth coupling) are in equilibrium in respect of the central plane of sprocket 8 or fine tooth coupling.

The optimum displacement must be established by experiment.

FIGS. 12 and 13 illustrate an example in which the pins take the form of cantilevers held in one of the members to be coupled (annulus and casing) their free ends engaging in a sprocket carried by the other of the members to be coupled.

Thus, in FIGURE 12, 47 denotes the gear casing, which is composite and consists of end bells 47a and 47b and a central drum 47c from which extends inwards a flange 47d. It is supported by feet or pads 47e attached to the central drum 47c.

Accommodated in axial holes in the flange 47d are the preferably cylindrical centre parts 48a of pins 48. The end portions 48b and 48c of each pin are barrel-shaped. They are connected to the centre part 48a by flexible necks 48d and 48e. The barrel-shaped ends of the flexible pins 48 engaged in the part cylindrical spaces or interstices between the teeth of sprockets 49a and 50a of the annuli 49 and 50 in which are provided the internal teeth 49b and 50b respectively.

FIGURE 2 shows part of annulus 49 with the sprocket teeth 49a and gear teeth 49b.

If the gear teeth 49b and 50b are helical, the axial thrusts must be taken care of, for instance by arrangements like those illustrated in FIGURE 6 or FIGURES 7 and 8.

The flexible pins 48 are held captive in the gear casing by thrust faces on internal flanges 47a' and 47b' respectively which also limit the possible axial float of the annuli 49 and 50.

Advantages of this form of the invention are the comparative cheapness of the present yielding retention means over e.g., fine tooth couplings, roller-chains or the like, as used in the earlier examples, ease of assembly and dismantling of the gear, and the simplicity and consequent cheapness of the gear casing. From an operating and endurance point of view, an important advantage is that in consequence of the high degrees of symmetry in respect of a plane transverse to the axis and bisecting the internal flange 47d the power flow through and forces acting on the two annuli will be equal and so will be the distortions of the gear casing end bells. Furthermore, as the gear casing is supported near this plane of symmetry, it is to be expected that the forces acting on the annuli will not cause unequal distortions and that unequal wear of gears and bearings will be avoided.

What we claim is:

1. In an epicyclic gear including a fixed structure, a sun pinion, an internally toothed annulus coaxial with said pinion, a planet carrier coaxial with said pinion and annulus, a plurality of planet wheels journalled on said planet carrier and meshing with both said sun pinion and said annulus and means retraining a component constituted by one of said three members, namely said sun pinion, annulus and planet carrier from relative rotation in relation to another component constituted by said fixed structure, the improvement which consists in said restraining means comprising a toothed sprocket concentric with and fast to one of said two components and a plurality of pins in the form of cantilevers fixed in the other of said components with their axes parallel with the axis of the component and their projecting ends engaging between the teeth of said sprocket, said pins being slightly flexible under the working load, thereby affording the one component two degrees of freedom transverse to the axis thereof sufficient to ensure equalisation of the load between the several planet wheels while maintaining the necessary circumferential restraint.

2. An epicyclic gear according to claim 1 wherein the free ends of said cantilever pins are of barrel contour where they engage between the sprocket teeth.

3. An epicyclic gear according to claim 2 in which the pins are double-ended, the centre portions being of larger diameter than the projecting portions and fast in bores in the one component while their outer ends engage between the teeth of respective toothed sprockets fast to the other of said components.

4. An epicyclic gear according to claim 3 having double helical teeth on the sun pinion, planet wheels and in the annulus in which the annulus is in two oppositely handed parts capable of sufficient transverse movement relative to one another to ensure equalisation of load and the respective sprockets are secured to the two parts of the annulus while the pins are fast to the fixed structure.

5. An epicyclic gear according to claim 4, in which the two oppositely handed parts of the annulus have bearing surfaces on their inner and outer ends and the fixed structure also has bearing surfaces which co-operate with the bearing surfaces on the outer ends of the two parts of the annulus in one direction of loading while the bearing surfaces on the inner ends of the two parts of the annulus bear against one another in the opposite direction of loading.

6. An epicyclic gear according to claim 4, in which the two oppositely handed parts of the annulus are secured together by flexible tie bars, the ends of the tie bars being secured to the respective parts and sufficient clearance being left round the tie bars elsewhere to permit flexing under relative transverse movement between the parts occasioned by the equalisation of the load.

7. An epicyclic gear according to claim 4, in which the oppositely handed two parts of the annulus are connected together by an axially resilient integral system of plate springs.

8. An epicyclic gear according to claim 4 in which the fixed structure is a casing having detachable both sides between which the parts of the annulus are located, and the component with the bores in which the centre portions of the pins are fast includes feet bolted to the casing.

References Cited

UNITED STATES PATENTS

| | | | |
|---|---|---|---|
| 1,624,416 | 4/1927 | MacFarland | 74—410 |
| 2,703,021 | 3/1955 | Stoeckicht | 74—801 |
| 2,999,401 | 9/1961 | Bedard et al. | 74—801 |
| 3,144,790 | 8/1964 | Davis et al. | 74—801 |
| 3,205,731 | 9/1965 | Black | 74—801 |
| 3,213,713 | 10/1965 | Sagara | 74—801 |
| 3,244,020 | 4/1966 | Breuer | 74—411 |

FOREIGN PATENTS

| | | |
|---|---|---|
| 24,903 | 3/1963 | Germany. |
| 1,231,219 | 4/1960 | France. |
| 1,180,208 | 10/1964 | Germany. |
| 298,471 | 5/1929 | Great Britain. |
| 612,883 | 11/1948 | Great Britain. |
| 734,223 | 7/1955 | Great Britain. |
| 881,190 | 11/1961 | Great Britain. |
| 980,089 | 1/1965 | Great Britain. |

DONLEY J. STOCKING, *Primary Examiner.*

THOMAS C. PERRY, *Examiner.*

UNITED STATES PATENT OFFICE
CERTIFICATE OF CORRECTION

Patent No. 3,352,177                                      November 14, 1967

Peter Herbert Cleff et al.

It is hereby certified that error appears in the above numbered patent requiring correction and that the said Letters Patent should read as corrected below.

In the heading to the printed specification, lines 3 to 5, for "Peter Herbert Cleff, Cyril Beavers, and William Walton, all of Wallsend Research Station, Wallsend-on-Tyne, England" read -- Peter Herbert Cleff, Cyril Beavers, and William Walton, all of Wallsend-on-Tyne, England, assignors to Pametrada Limited, Wallsend Research Station, Wallsend-on-Tyne, Northumberland, England, a body corporate of Great Britain --.

Signed and sealed this 7th day of January 1969.

(SEAL)

Attest:

Edward M. Fletcher, Jr.

Attesting Officer

EDWARD J. BRENNER

Commissioner of Patents